United States Patent [19]

Atwater

[11] 4,189,732
[45] Feb. 19, 1980

[54] MOTOR ACTUATING CIRCUITRY

[75] Inventor: Jerrold B. Atwater, North Plainfield, N.J.

[73] Assignee: Lockheed Electronics Co., Inc., Plainfield, N.J.

[21] Appl. No.: 782,746

[22] Filed: Mar. 30, 1977

[51] Int. Cl.$^2$ ............................................. G01S 9/00
[52] U.S. Cl. ................................... 343/5 R; 318/677; 318/678; 318/681; 318/317; 318/331; 318/341
[58] Field of Search ............... 318/331, 339, 317, 342, 318/343, 347, 345 B, 345 F, 341, 677, 681, 678; 330/130, 137, 96, 127, 128; 363/21; 343/5 R

[56] References Cited

U.S. PATENT DOCUMENTS

| | | | |
|---|---|---|---|
| 3,319,175 | 5/1967 | Dryden | 330/127 |
| 3,419,781 | 12/1968 | Jullien-Davin | 363/21 |
| 3,478,275 | 11/1969 | Walker | 330/127 |
| 4,053,848 | 10/1977 | Kleische | 330/128 |

OTHER PUBLICATIONS

Boll et al., "Linear Bidirectional Servo-mechanism", Jan. 1972, pp. 2333-2334.

Primary Examiner—Gene Z. Rubinson
Assistant Examiner—Eugene S. Indyk
Attorney, Agent, or Firm—Hopgood, Calimafde, Kalil, Blaustein & Lieberman

[57] ABSTRACT

Motor driver/control apparatus employs a motor speed regulating amplifier configuration, e.g., two push-pull power amplifiers operable responsive to a motor speed-direction command input signal, and having the motor differentially connected between amplifier output ports. The amplifier(s) are supplied with an energizing potential of variable amplitude just sufficient for amplifier operation and to satisfy the then obtaining motor consumption. Accordingly, system power is effectively utilized; needless power drain avoided; and the amplifier cost and complexity is reduced since the amplifier need not dissipate inordinate source-supplied energy not required for motor actuation.

In accordance with one further aspect of the present invention, a power supply switching regulator for a motor utilized in a radar application is operated at the radar pulse repetition rate. This produces a non-interferring zero frequency beat between the power supply and radar pulse rate in the radar receiver.

7 Claims, 1 Drawing Figure

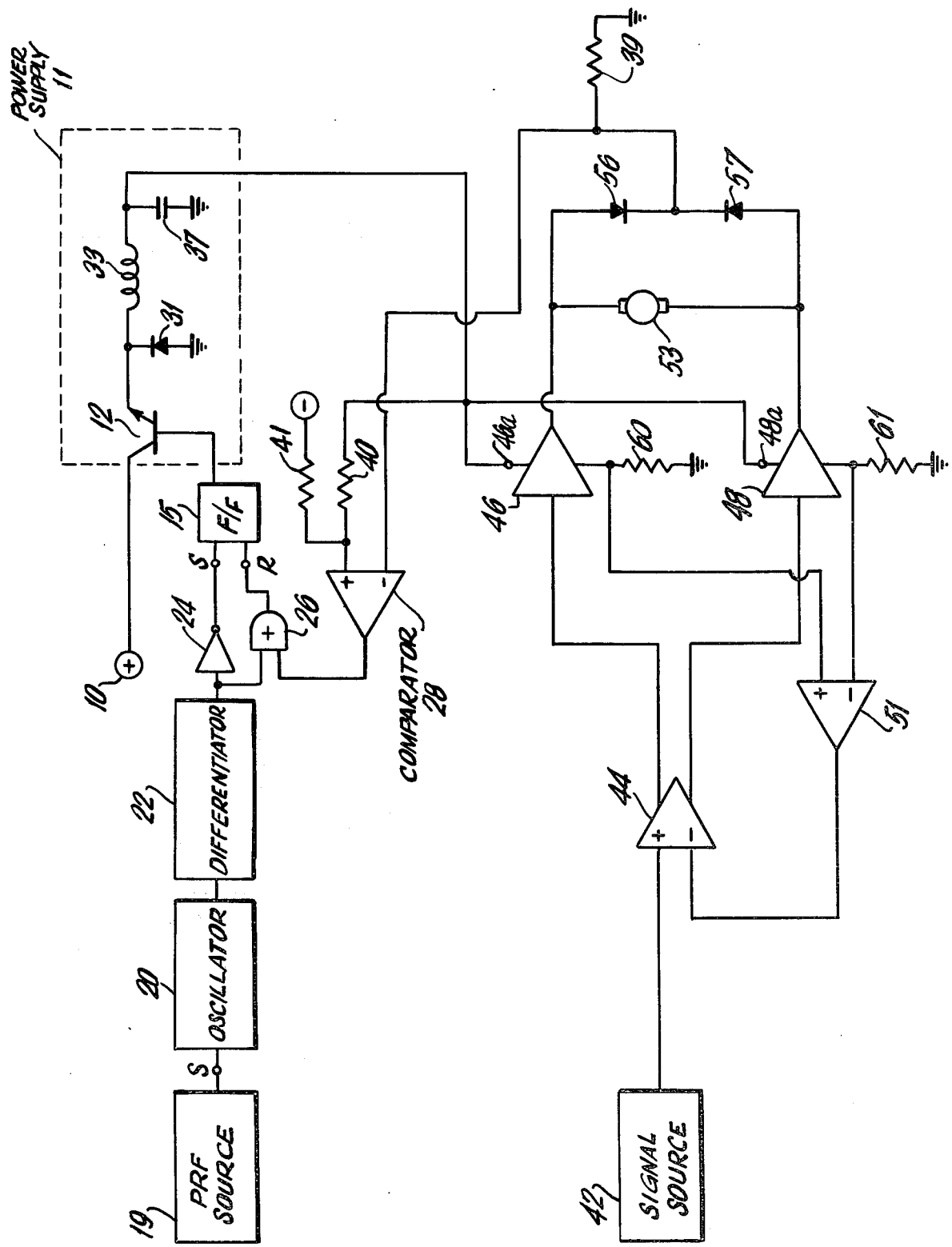

MOTOR ACTUATING CIRCUITRY

This invention relates to motor control/driver apparatus and, more specifically to improved power-efficient electronic motor actuating circuitry.

It is an object of the present invention to provide improved motor controlling/driving apparatus.

More specifically, it is an object of the present invention to provide motor actuating circuitry which reversibly energizes a controlled motor at a variable rate while obviating needless energy expenditure.

It is another object of the present invention to provide a switching regulator power source for a radar antenna motor which is enabled at the radar pulse repetition rate to avoid spurious radar-power supply oscillation beat signals.

The above and other objects of the present invention are realized in a specific, illustrative motor actuating circuit which employs two motor-driving power amplifiers having the motor connected between their output terminals. The power amplifiers are connected in a feed-back loop for energizing the motor for rotation in a direction, and at a speed, specified by a system input signal source.

A switching regulator provides D.C. supply potential to the power amplifiers. In accordance with one aspect of the present invention, the switching regulator controlled power source is adapted to continuously develop the minimum amplifier energizing potential required for the currently obtaining loaded motor rotational rate. Thus, power drain from the direct current source is reduced. This contrasts with the situation where the power supply developes the peak voltage required, and power simply dissipated when a lesser, non-peak requirement is demanded of the motor.

In accordance with another aspect of the present invention, the switching regulator for a radar application motor context is driven at the radar pulse rate frequency (p.r.f.)—or frequencies bearing an integral multiple relationship therewith. Accordingly, zero frequency electronic beats result between the switching power supply and radar pulse frequency, eliminating one potentially substantial source of spurious radar system signals.

The above and other features and advantages of the present invention will become more clear from the following detailed description of a specific illustrative motor controller/actuator embodying the principles of the present invention, considered herein below in detail in conjunction with the accompanying drawing which schematically depicts such apparatus.

Referring now to the drawing, there is shown improved actuator and control apparatus for driving a motor 53. It will be assumed that the motor 53 drives a load (not shown) via a coupled shaft for doing some form of useful work, and that the motor is to be selectively turned off or turned on in either direction, at a variable rate, all under control of an electrical command signal supplied by signal source 42. It is further assumed that the motor 53 is a direct current motor, and that energy for driving the motor emanates from a DC source 10 of any type, e.g., a storage battery, a generator, a DC main, or the like. It will further be assumed that voltage from the source 10 is unregulated, although such obviously need not be the case.

In overall basic terms, the motor 53 is differentially connected between the outputs of two power amplifiers 46 and 48 which are supplied with power at ports 46a, 48a from the output capacitor 37 of a switching regulator controlled DC power supply 11, and which are respectively connected to ground by resistors 60 and 61. The output from the signal source 42 is connected to the non-inverting input of a paraphase differential amplifier 44 having its oppositely poled outputs connected to the inputs of the power amplifiers 46 and 48. To complete a motor direction and rate control feed-back loop, the voltage developed across the power amplifier 46 and 48 grounding resistors 60 and 61 (those voltages thus being proportional to amplifier current) are differentially compared in an amplifier 51, and the output of amplifier 51 supplied as the non-inverting input to the paraphase amplifier 44.

The above described motor direction and speed controlling feed-back loop operates in a manner per se conventional. Thus, (assuming something other than a "motor stop" signal), the signal source 42 supplies a signal which specifies the direction of rotation and speed of rotation for the motor 53. Through feedback action, the source 42 supplied signal unbalances the input signals supplied to power amplifiers 46 and 48 in a polarity relationship which specifies the direction of rotation, and in an amount which signifies the rate of rotation desired for the motor 53. Such unbalanced inputs to power amplifiers 46 and 48 give rise to a differential electromotive force applied across the motor 53 in one polarity or another, causing the motor to rotate in a direction specified by such resulting polarity and at a speed determined by the amount of such unbalance. As the motor rotates, it of course draws current out of the output of one of the power amplifiers 46 or 48, viz., out of the amplifier having the more positive output, and supplies current into the output of the other amplifier 46 or 48 characterized by the lower output potential. Accordingly, one of the amplifiers 46, 48 serves as a current source while the other amplifier serves as a current sink when the motor is energized under control of the output of the signal source 42.

With the above current source/current sink operation characterizing the amplifiers 46 and 48, the resistor 60 or 61 connected to the amplifier acting as a current source will have less current flowing therethrough than the other resistor connected to the amplifier then serving as a motor current sink. Accordingly, the voltage across the resistors 60 and 61 becomes unbalanced from the inert motor condition. This voltage differential is sensed and amplified in amplifier 51 and comprises the feed back signal to the inverting input of the servo paraphase "error" amplifier 44. The feed-back loop operates in the manner well known to the skilled in the art to assure that the current unbalance in resistors 60 and 61, and thereby also the drive applied to the motor 53, accords with the output signal supplied by the signal source 42 thus assuring that the shaft of the motor 53 turns in a direction and at a speed specified by the signal source 42.

The DC energizing or bias power applied to the power amplifier operating voltage receiving input ports 46a and 48a is variable, and comprises the output of a switching regulator controlled power supply 11. That is, in accordance with the principles of the present invention, the apparatus shown in the drawing automatically adjusts the output of the power supply (corresponding to the voltage across capacitor 37) to be the minimum potential required to drive the motor 53 (corresponding to the higher of the output voltages of the amplifier 46 or 48) plus the voltage required to operate the internal elements of the amplifier 46 or 48 which provides the higher output potential. Thus, for example, where the output configuration of the power amplifier 46 and 48 comprises a conventional "totem pole" output configuration, the power supply 11 output potential is sufficient to provide the necessary collector-emitter potential to maintain the totem pole emitter follower transistor connected to the output of power supply 11 on.

It is one of the fundamental purposes of the present invention to effectively use power supplied by the DC source 10. To this end, as above noted, the power supply 11 develops at its output just that voltage needed to drive the motor 53 at the rate of speed signalled by the input signal source 42, together with that relatively fixed extra increment required to maintain the elements in the power amplifier 46 or 48 having the higher output potential fully operative. Thus, as motor 53 is driven at a faster rate of speed, the voltage of the power supply 11 increases to permit application of the required increasing power to the motor 53. Similarly, as the speed of rotation of the motor 53 shaft decreases, power supply 11 delivers a lower output potential. This contrasts with prior art systems where the source 10 and/or power supply 11 (where used) delivers a fixed voltage corresponding to that required for maximum motor loading. In such prior art arrangements, at less than peak loading, the extra potential and power delivered by the power supply was required to be dissipated in the amplifiers 46 and 48, thus requiring substantially larger and more highly rated amplifier components, heat sinking and the like, as well as needlessly draining the source 10.

To effect this automatically variable power voltage applied to the amplifier power ports 46a and 48a depending upon load requirements signalled by source 42, the power supply 11 comprises a switching regulator having a series pass transistor 12, a series inductance 33, a shunt capacitor 37 and a diode 31. The elements 12, 31, 33 and 37 operate in the per se well-known switching regulator mode to control the DC output potential across capacitor 37 by modulating the on/off signal applied to the control or base terminal of the series pass transistor switch 12 (pulse width modulation in the arrangement of the drawing). In particular, when the transistor 12 is off and energy drained from inductor 33, diode 31 is back biased and the capacitor 37 drives the output load, i.e., the amplifiers 46 and 48. Correspondingly, when the series pass transistor 12 is turned on (saturated and therefore consuming very little power) the voltage difference between the voltage across capacitor 37 and that obtained by the source 10 is applied across the inductor 33 such that a rising current is developed therein to add charge to the capacitor 37, thereby increasing the output potential of supply 11. When the transistor switch 12 opens, the energy stored in the field of inductor 33 is transferred into the capacitor 37 on a resonant charge basis via the diode 31.

To control the power supply series pass transistor switch 12, an oscillator 20 supplies its output to a differentiator 20 which provides pulses of opposite polarity each half cycle of the assumed symmetrical output of the oscillator 20. Each negative output of the differentiator 22 is inverted by inverter 24 such that a flip-flop 15 is set once each cycle of the oscillator 20. When the flip-flop is set, it supplies an enabling potential to the base of transistor 12 turning the transistor on. Correspondingly, the positive output of the differentiator 22, 180 electrical degrees remote from the negative output thereof for the assumed symmetrical output of oscillator 20, comprises a pulse which passes through a logic OR (i.e., disjunctive) gate 26 to reset the flip-flop 15, thereby turning off the series pass transistor 12.

The flip-flop 15 is also reset via the OR gate 26 by the output of a comparator 28. In brief, it is the function of the comparator 28 to compare the higher output voltage present at the output ports of the amplifiers 46 or 48 (supplied to the inverting input of the comparator 28) with a measure of the output potential supplied by the power supply 11 to the amplifier driving the power ports 46a or 48a. When the power supply 11 is already supplying either an adequate or an excessive voltage level, the input to the non-inverting input of comparator 28 exceeds that supplied to its inverting input, thereby generating a positive comparator output potential which passes through OR gate 26 to reset the flip-flop 15 and maintain it reset. Thus, except for a very short transient which occurs once each cycle for the oscillator 20 at the output of the inverter 24, the flip-flop 15 remains reset and the series pass transistor 12 remains off. Accordingly, charge is progressively drawn from the capacitor 37 to decrease the output potential of power supply 11, i.e., to decrease the potential supplied to the amplifiers 46a and 48a such that this condition of excessive voltage is automatically cured.

Correspondingly, if an insufficient voltage is being supplied by the power supply 11, the potential at the inverting input of comparator 28 exceeds the voltage supplied to the non-inverting input thereof. When this condition obtains, the comparator 28 output is negative and does not reset the flip-flop 15 through the OR gate 26. Accordingly, the series pass transistor 12 is turned on at the frequency of the oscillator 20 with a fifty percent active duty cycle factor such that the power supply 11 builds up potential across capacitor 37 to the proper level. Thus, the apparatus shown in the drawing and above described automatically maintains the output of the power supply 11 at precisely the right level to drive the motor 53 at the rate specified by the signal source 42 without supplying excess power which must be dissipated in the amplifiers 46 and 48.

Several matters are now observed. First, diodes 56 and 57 having common cathodes have their anodes connected to the outputs of the amplifiers 46 and 48 and which cooperate with the resistor 41, act as an analog OR gate or peak detector. That is, the diode 56 connected to the amplifier 46 or 48 having a higher output potential is turned on and substantially impresses the output potential of the corresponding amplifier across resistor 39. Correspondingly, the other diode 56 or 57 connected to the output of the amplifier 46 or 48 having the lower potential of the two is reverse biased and thus non-conductive. Accordingly, the elements 56, 57 and 41 cooperate to supply the higher of the potentials appearing at the outputs of the amplifier 46 or 48 (with only minor reduction for the forward drop of the conductive diode 56 or 57) to the inverting input of the comparator 28 as above described. Similarly, the non-inverting input of comparator 28 is connected to the junction point of voltage divider resistors 40 and 41 which build into the voltage regulating feed-back loop an offset requiring that the voltage output of the power supply 11 in fact exceed the higher of the amplifier 46 or 48 outputs (rather than be equal to such amount). This develops the extra voltage required for proper operation of the amplifier 46 or 48 having the higher output potential to maintain such amplifier fully operative.

Further, it is observed that the output of comparator 28 may be directly connected to the base of transistor 12 to control the switching regulator power supply 11 in a per se fully functional manner. For such an operation, the switching regulator is not driven at a fixed oscillation rate, but rather at a variable rate which depends upon current drain and upon such hysteresis as may be built into the comparator circuit, as again per se well known to those skilled in the art for switching regulator operation.

In accordance with one further aspect of the present invention, let it be assumed now that the motor 53 performs in a radar context, e.g., to position a radar antenna in a desired position or to continuously rotate such antenna. In such an event, the obtaining radar pulse rate frequency (prf) source may be employed to synchronize the oscillator 20 to the p.r.f. frequency (i.e., the frequency at which a pulsed radar is actuated to emit interrogation pulses). By employing such an arrangement, the switching regulated power supply 11 is actuated at the radar pulse rate frequency, such that the radio frequency interference (r.f.i.) typically generated by a switching supply will be at the pulse rate frequency such that the beat signal therebetween will be at zero frequency. Accordingly, such a zero frequency beat will not cause spurious interference signals to impede the radar receiver electronics which process target-reflected radar pulses.

The arrangement shown in the drawing and discussed above has thus been shown to very efficiently use energy drawn from the source 10, supplying to the amplifiers 46 and 48 only such potential as may be required, and to obviate the necessity of employing bulky components and heat sinking capability for such amplifiers. Further, by synchronizing the characteristic frequency for the switching regulated power supply, switch regulator-produced radio frequency interference is obviated as a spurious interference signal source.

The above described arrangement is merely illustrative of the principles of the present invention. Numerous modifications and adaptations thereof will be readily apparent to those skilled in the art. Thus, for example, the power receiving ports 46a and 48a may be independently energized, employing seperate switching regulated power supplies for each, rendering such a configuration even more power efficient and the like. Thus also, a regulated power supply of any type, employing a measure of motor potential as a reference, may be employed.

What is claimed is:

1. In combination in apparatus for variably energizing a motor from a power source, an amplifier having a motor control signal receiving input port, a motor driving output port, and a variable power voltage receiving port; variable output voltage power supply means connected to said amplifier variable power voltage receiving port, said variable output voltage power supply means comprising a variable output voltage switching regulator including series connected controlled switch means and an inductance, a diode connected intermediate said switch means and said inductance and an output capacitor connected to said inductance; and switch controlling means having an output connected to said controlled switch means, a first voltage sensing input connected to said amplifier output port, and a second voltage sensing input connected to the output of said variable output voltage power supply means, further comprising a radar antenna driving motor connected to said motor driving output of said amplifier, and a radar pulse rate pulse source for signalling the radar antenna transmission intervals connected to said switch controlling means for enabling said controlled switch means only during said transmission intervals, whereby electronic switching noise generated by said power supply means occurs only during radar transmission intervals and does not interfere with radar reception.

2. A combination as in claim 1 wherein said amplifier means comprises first and second push pull connected drivers each having variable power voltage receiving port and a motor driving output port, and peak detector means connected to the output port of each of said push pull driver means for supplying the larger of the potentials there appearing to said first voltage sensing input of said switch controlling means.

3. A combination as in claim 1 wherein said switch controlling means comprises a comparator.

4. A combination as in claim 1 wherein said controlled switch means comprises a transistor having a base terminal, bistable means having first and second stable states and having an output connected to said base terminal of said transistor, pulse source means connected to an input of said bistable means for setting said bistable means to reside in a first one of its stable states, and wherein said switch controlling means comprises comparator means having inputs connected to said first and second voltage sensing inputs and having an output connected to an input of said bistable means for resetting said bistable means to its second stable state.

5. A combination as in claim 1 further comprising disjunctive logic means having inputs connected to said pulse source means and to said comparator for resetting said flip-flop to its second stable state.

6. A combination as in claim 1 further comprising motor means connected to said amplifier output port.

7. A combination as in claim 1 further comprising motor command signal means connected to said signal receiving input port of said amplifier means.

* * * * *